United States Patent [19]
Joubert

[11] Patent Number: 5,154,615
[45] Date of Patent: Oct. 13, 1992

[54] EDUCATIONAL TOY

[76] Inventor: Michael H. B. Joubert, 508 Russell Hill Road, Toronto, Ontario M5P 2S9, Canada

[21] Appl. No.: 729,270

[22] Filed: Jul. 12, 1991

[51] Int. Cl.$^5$ .............................................. G09B 23/18
[52] U.S. Cl. .................................. 434/301; 434/379; 446/90; 446/91
[58] Field of Search .............................. 434/301-379; 446/90, 91, 484, 75

[56] References Cited

U.S. PATENT DOCUMENTS 2,994,154  8/1961  McCaa ................................. 446/90

OTHER PUBLICATIONS

Science Electronics, Inc., "Erectronic", Feb. 1957.
Welch Scientific Co., "Bell Outfit", Oct. 1965, p. 242.
Fisher Scientific Co., "Self Inductance and Series Parallel Circuit Apparatus", Feb. 1969, p. 287.

Primary Examiner—Richard J. Apley
Assistant Examiner—Karen Ann Richard
Attorney, Agent, or Firm—Bereskin & Parr

[57] ABSTRACT

An educational toy for use with children in an age range of about 4 to 12 as a mounting base with an upper surface on which various action modules are mounted. The action modules include a DC power source, and a switch. The action modules can include a number of devices capable of producing light such as light bulbs, sound such as a buzzer or bell and motion such as a DC motor and gear box and drive belts. The wire connecting the switch to the action modules are connected by realtively large alligator clamps that can be manipulated by a relatively young child. The base for the toy comprises an internal hollow cavity. During shipment from the factory to the retailer and from the retailer to home, the action modules, the battery module, batteries and the like are all stored within the cavity of the base. The cavity can be closed by paste on paper or shrink wrap or the like. This provides a cheap but intellectually challenging variable top for experimentation by the developing child.

6 Claims, 2 Drawing Sheets

EDUCATIONAL TOY

FIELD OF THE INVENTION

This invention concerns an educational toy for use by young children. The toy provides a number of features to stimulate the young enquiring mind as to transferring electrical energy from a voltage source such as a battery to a plurality of devices capable of producing light, sound or motion. The child can experiment with the toy by selectively connecting and disconnecting various modules as desired.

Various electrical energy kits are available on the market today. These include relatively sophisticated devices which may be powered either from household current or batteries and which may be selectively connected in varying means. Some of these are sold in the form of relatively sophisticated kits having a great number of electrically powered devices which may be plugged into the kit to form various items. Some of these include items such as basic electrical components only while others are as sophisticated as to create simple radio receiving devices and the like. Devices of this type are useful in stimulating the mind of the older child who is in a position to experiment at a more sophisticated level. Such devices are, however, often overly complicated and decidedly expensive for use by the younger child.

One of the objects of this invention is to create a device which is relatively simple and can be shipped and packaged in an economically advantageous fashion while having sufficient variation of components to be stimulating to a child in the range of 4 to 12 years. Such a device ideally must be relatively inexpensive to produce and must not require significant motor or comprehension skills to connect and disconnect the various modules so as to be acceptable for a child of this intellectual development.

Another object of this invention is to provide a plurality of modes in order that the child may experiment with electrical energy passing through various electrical energy converting devices. Preferably, the converting devices involve one or more of sound producing devices, motion producing devices and light producing devices.

Another object of the invention is to provide a unit that may be economically manufactured and used for safe efficient transport from the manufacturing phase through the marketing phase so that the device may be purchased in a compact and economical fashion at the store, taken home and assembled, and then used by the child.

SUMMARY OF THE INVENTION

In accordance with this invention an educational toy has a base. The base has an upper mounting surface and side and end walls. The base has an internal cavity. There are a plurality of action modules which can be mounted on a mounting surface of the base. The action modules can be stored within the cavity of the base to facilitate transportation of the toy. The action modules can be assembled to the mounting surface of the base. The action modules include at least the following items, a battery pack, a switch, a motor and a plurality of indicating means. There are in addition a plurality of current carrying wires to connect the foregoing. At least some of the wires are fitted with quick disconnect connecting means so that a child may selectively connect or disconnect one or more of the motor and indicating means to the battery pack through the switch.

Various other aspects and objects of the invention will be apparent from the following description of a preferred embodiment of the invention and in which.

Figure 1:
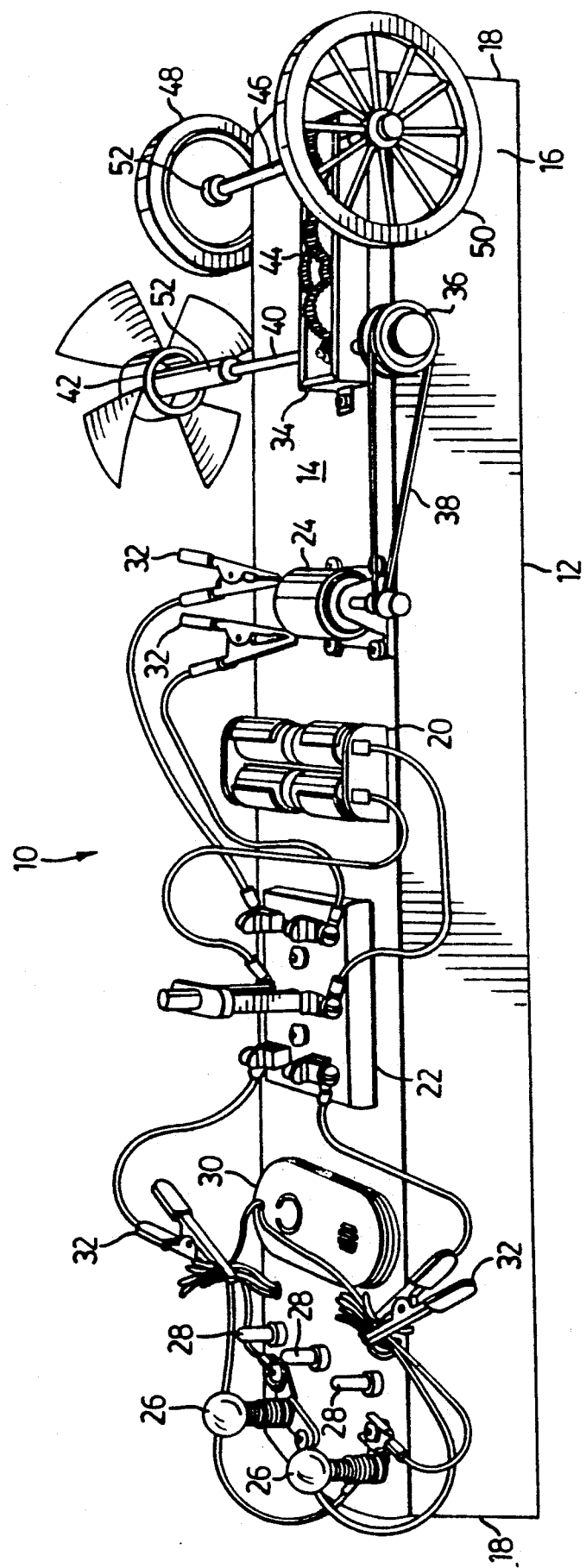
FIG. 1 is a perspective view of the assembled toy ready for use by the child.

The toy 10 comprises a base 12. The base 12 has an upper mounting surface 14, a pair of side walls 16 and a pair of end walls 18.

The base 12 may be advantageously moulded from a plastic material having sufficient strength for the intended use, otherwise being quite economical to manufacture. Surface 14 provides a mounting surface on which the action modules referred to hereinafter may be mounted. The surface may be moulded to included appropriate recesses and bosses as well as electrical sockets and the like to accommodate the various action modules including the indicating means referred to hereinafter. By appropriately moulding the bosses sockets and the like, assembly of the device by the child's parent or even a more sophisticated child may be accomplished easily and with a minimum amount of instructions. There is, of course, no limitation on the number of action modules which may be mounted on the mounting surface or their relative orientation one to another.

FIG. 1 illustrates by way of example an embodiment of the invention in which the various modules have been grouped. The fundamental module on the device is a source of electrical energy. In this case, a battery pack 20 is relatively centrally mounted on the mounting surface 14. Advantageously, the battery pack will contain two one and a half volt batteries connected together in series to provide a three volt current supply. A very low voltage is to be preferred in order that there be no chance of the child experiencing damaging electrical currents. In this way, if the young child inadvertently creates a direct short circuit no substantial harm will occur. The batteries are readily replaceable as required.

Switch 22 is mounted on the mounting surface 14. The switch 22 as shown is a relatively large double pole double throw switch. The switch is sufficiently large as to be easily manipulable by a relatively young child. Preferably the switch is relatively large with parts which the child can see moving in order to provide the child with both the visual and physical aspects of making and breaking electrical connections. The central terminal of the switch 22 is connected to the battery pack 20 by means of suitable wires. The wires are advantageously fixed to the switch for relatively permanent mounting by means of screws.

There is also mounted on the mounting surface 12 a three volt DC motor 24. The motor 24 has a drive pulley which may be used to drive various mechanical devices.

In addition to the action modules described above, the action modules further include a variety of indicating means. The indicating means as demonstrated on the embodiment shown in FIG. 1 include a pair of similar lightbulbs 26 of the kind used in flashlights, three light emitting diodes 28 and a sound device 30. The lightbulbs 26 can produce either white or coloured light as desired and need not necessarily produce the same colour light. Similarly, the diodes 28 may each be different in colour or the same. The sound producing device 30 may be as simple as a buzzer or electrical bell. Alternatively, the sound device may be more sophisticated and play a simple tune.

The lightbulbs 26 and the light emitting diodes 28 are all individually wired so that each may be operated individually or collectively. Advantageously, the mounting surface 14 comprises an opening or aperture in the upper surface located adjacent these light devices. Electrical wires extend externally from the lightbulbs 26 where they are permanently affixed to the base of the bulb to a location where the wires may all be interconnected. Sockets for the LED devices 28 may be connected on the underside of surface 14 with wires appearing from beneath the mounting surface through the holes to the point of common connection. Similarly, the electrical wires extending from the sound producing device 30 will also proceed to the common point of connection. As illustrated in FIG. 1, the two common points of connection are in turn connected by alligator clamps with connecting wires attached to one side of the double throw switch.

The alligator clamps 32 are used to selectively connect the sound and light devices as well as the motor 24. In this manner the child may disconnect the motor from the circuit at any time by removing one of the alligator clamps. Similarly, the child is encouraged to follow the wiring and to selectively connect and disconnect one or more of the light signalling devices and the sound device. The wires may be colour coded to assist in understanding the concept of making an electrical circuit.

In each case, a child will come to recognize that there is a fixed amount of power available from the battery source. If when the switch is closed, the only element connected is the sound device, there will then be a relatively significant amount of sound. On the other hand, if all of the lights are included with the sound device, there will be less volume to the sound device. Similarly, the brilliance of the lights will change depending on how many are included within the circuit.

As the child's fascination and ability to use the toy grows, the child will begin to follow the wires from one device to another and to make the point of common connection and break that connection as desired to include the various devices. Alligator clamps 32 are suggested as the quick disconnect means so as to be manipulable by the child with ease. Other types of connectors may also be used but it is considered that the preferred embodiment uses relatively large devices which can be operated by a child to provide both the ease of mechanical manipulation while providing a visual stimulus so that the child can come to understand how the connect disconnect means works.

The switch 22 preferably connects either the indicating means or the motor in order that the load placed on the batteries is not too great. When mechanical motion is to be desired, the switch is moved to the position to include the motor in the powered circuit.

The motor 24 may be used to drive a gear box 34 mounted on the mounting surface. The gear box 34 comprises a drive pulley 36 which may have more than one drive diameters. In the device as shown, there are two drive diameters or grooves thereby producing various speeds of motion in the gear box. Advantageously, a simple elastic band 38 may be used as a drive belt. The elastic band can then accommodate different size driven pulleys. Where appropriate, a number of elastic bands could be provided to drive some of the bigger driven pulleys.

In the gear box 34 the driven pulley 36 operates on a driven shaft 40 which extends across the mounting surface to turn a pulley which is a fan 42. The fan 42 will provide a breeze which can be felt by the child. As sophistication grows, the child will realize that by reversing the alligator clamps 32 on the motor 24, the direction of rotation of the motor, gear box and the fan can be reversed producing a breeze in the other direction.

The gear box itself comprises a plurality of gears 44. The gears transfer mechanical motion from shaft 40 to shaft 46. By leaving the gear box open at the top, the child can observe the working of the gears. By arrangement of the various numbers of teeth on the gears, shaft 46 may turn at either the same speed as shaft 40 or at a greater or lesser speed as desired by the manufacturer of the device. In the device shown, shaft 46 extends across the mounting surface. On one end is mounted a pulley in the form of a substantially solid wheel 48 while on the other there is a pulley in the form of open spoked wheel 50. The solid wheel 48 may be provided with a variety of colour charts or the like so that the child may observe the effect of spinning colours in the scheme of the well known colour wheel.

The two shafts 40 and 46 are advantageously of the same diameter and the same length. Each extends across the full width of the mounting surface 14 so that the pulleys, fans and the like may be mounted thereon and turn without contacting the base. Each of the pulleys comprises a hub portion 52. Those of fan 42 and solid wheel 48 are visible in FIG. 1. Each of the hubs 52 of the driven pulley 36, the fan 42, the solid wheel 48 and the spoked wheel 50 are of different axial length. By having the hubs 52 of four different axial lengths, any of the devices may be mounted on either of the two shafts and either end of each shaft all at once without interfering one with the other. One or more of these devices may also contain a suitable groove to act as the driven pulley driven by elastic band 38. The minor misalignment that would occur by reason of the different length of the hub 52 can be accommodated by the flexibility of the elastic band 38. Advantageously each pulley and fan comprises a groove to locate and retain the elastic band.

Figure 2:
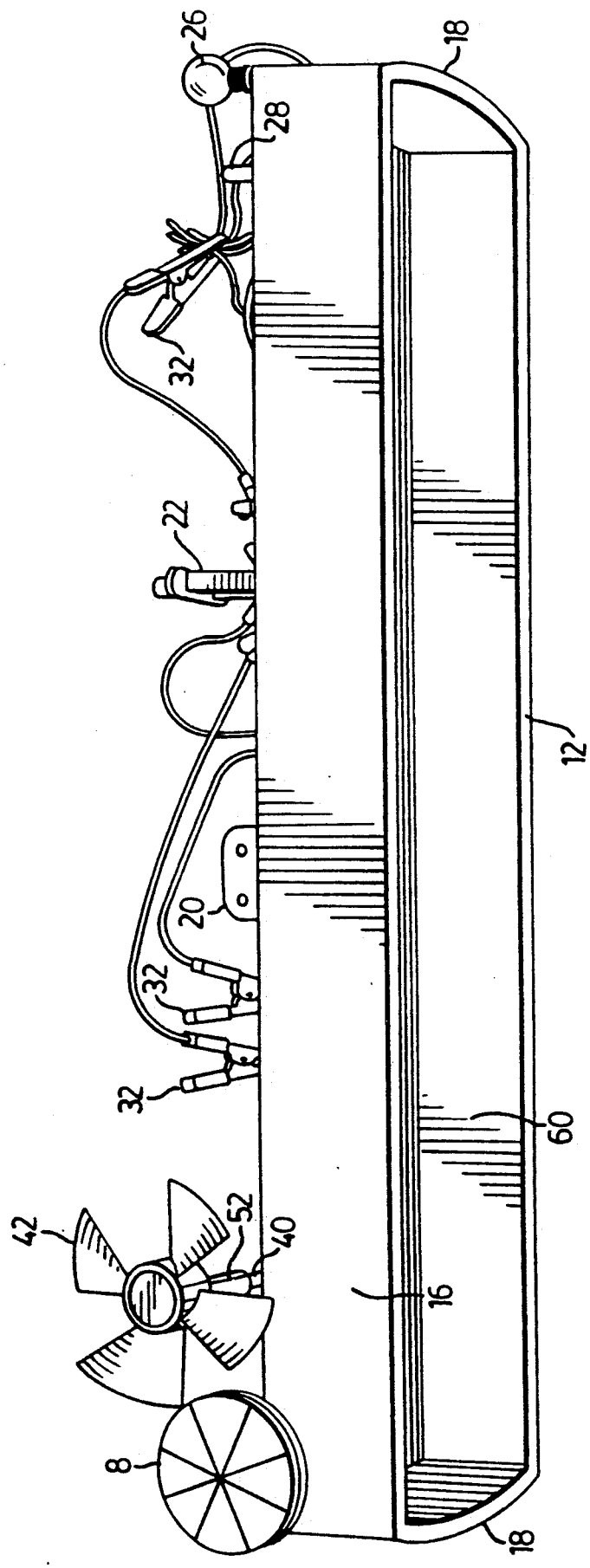
FIG. 2 is a view of the underside of the base illustrating the cavity in which the action modules may be stored.

FIG. 2 shows the base 12 from the bottom. It will be observed that the base 12 includes a cavity 60. Prior to home assembly all of the items including the gear box, the shafts for the gear box, the pulleys to be mounted on the shafts, the lightbulbs, the light emitting devices, the sound device, the switch, the battery pack and batteries, the motor, screws all wires and alligator clamps and appropriate mounting hardware may be accommodated within the cavity of the base. Thus, during shipment, the base provides a protective package which will serve for economical protective packaging during the shipping phase from manufacturer to retailer and from retailer to home. The base cavity may be closed by a glued on paper label or by other disposable means which may be removed by the purchaser on reaching home. Any necessary instructions for assembly and use of the device may also be included within the cavity. When the purchaser assembles the device, the action modules are removed from the cavity and mounted on the surface 14 by means of screws. The base may be provided with suitable holes for the fasteners. The electrical wires are then mounted using screws for those which are more permanent connections.

Various modifications and alternate arrangements of the components may be made. Any number of other devices to create sound, motion, light or other effects may be included among the various action modules. The action modules could also be modified in virtually unlimited ways to include more moving devices. The cavity may be fitted with a removable panel. The panel could be included by way of hinges or by way of a sliding track. The invention is not confined to the specific example or layout of devices as presented. The invention may vary within the scope of the following claims.

I claim:

1. An educational toy comprising a base, said base having an upper mounting surface and side and end walls, said surface, side and end walls comprising an internal cavity within said base with one open side for containing action modules within said cavity during shipping, a plurality of action modules for mounting on said mounting surface, fastening means for fastening said action modules to said mounting surface, said action modules including at least the following, a battery pack, a switch and an electric motor, and one or more indicating means and current carrying wires for interconnecting said action modules and a plurality of quick disconnect connecting means, so that a child may selectively connect or disconnect one or more of said motor and said indicating means to said battery pack through said switch, and a closure for closing said cavity so that all said action modules may be retained within said base during shipping.

2. The toy of claim 1 wherein said indicating means include visual indicating means.

3. The device of claim 2 wherein said indicating means further include sound producing means.

4. The device of claim 3 in which said indicating means includes a gear box having two driven shafts.

5. The device of claim 4 in which said indicating means include a plurality of pulleys for mounting on the ends of said driven shafts.

6. The device of claim 5 wherein said pulleys have a hub for mounting on said shafts and each of said hubs have different axial lengths so that said pulleys do not contact each other when mounted on said shafts.

* * * * *